Feb. 5, 1924.

O. C. HUGHES 1,482,683

DIRIGIBLE HEADLIGHT CONSTRUCTION FOR MOTOR VEHICLES

Filed March 22, 1923   2 Sheets-Sheet 1

Witnesses:
F. L. Fox,
N. Berman

Ora C. Hughes,
Inventor

By Clarence O'Brien
Attorney

Feb. 5, 1924.
O. C. HUGHES
1,482,683
DIRIGIBLE HEADLIGHT CONSTRUCTION FOR MOTOR VEHICLES
Filed March 22, 1923  2 Sheets-Sheet 2
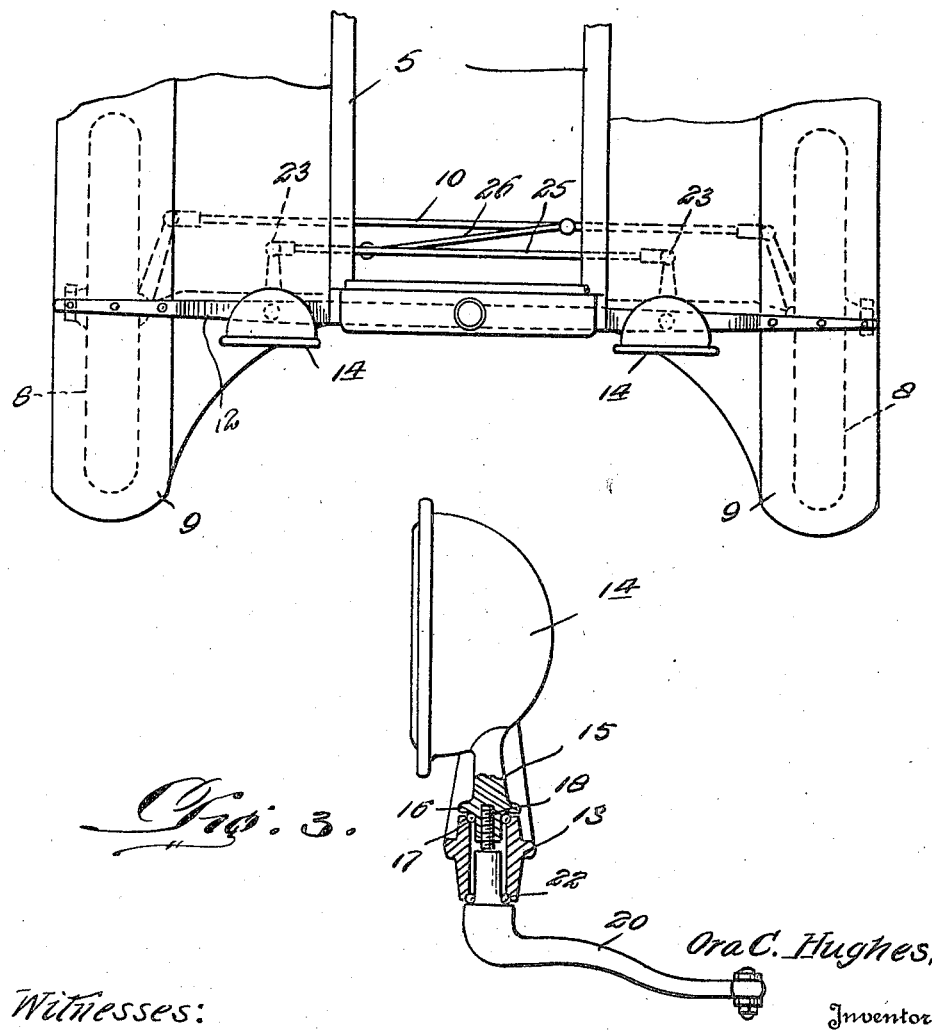

Patented Feb. 5, 1924.

1,482,683

UNITED STATES PATENT OFFICE.

ORA C. HUGHES, OF VILLA RIDGE, ILLINOIS.

DIRIGIBLE HEADLIGHT CONSTRUCTION FOR MOTOR VEHICLES.

Application filed March 22, 1923. Serial No. 626,747.

*To all whom it may concern:*

Be it known that I, ORA C. HUGHES, a citizen of the United States, residing at Villa Ridge, in the county of Pulaski and State of Illinois, have invented certain new and useful Improvements in Dirigible Headlight Construction for Motor Vehicles, of which the following is a specification.

In carrying out the present invention, it is my purpose to provide a dirigible headlight construction for vehicles, that may be positioned in a simple and expeditious manner upon the front end of the vehicle, without substantially altering the construction thereof.

A further purpose of my invention is the provision of such a headlight construction, wherein the supporting member for the headlight will effect a substantial brace for the front wheel fenders.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 2 is a top plan view of Figure 1, with the fenders in place.

Figure 3 is a side elevation, partly in cross section of one of the headlights, and its directly associated mechanism.

Figure 1:
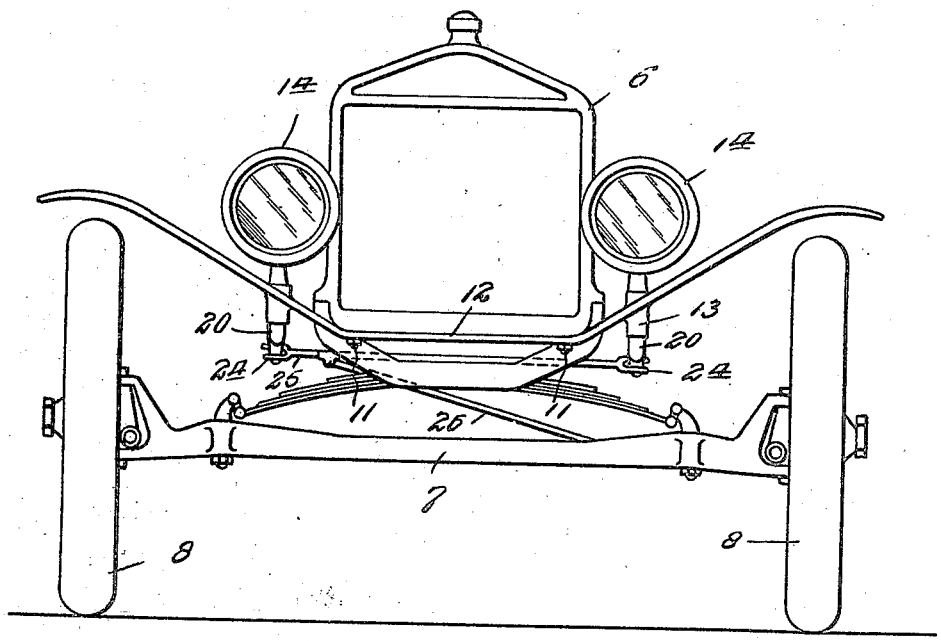
Figure 1 is a front elevation of a vehicle equipped with my improved headlight construction, the front fenders thereof being removed.
Figure 4:
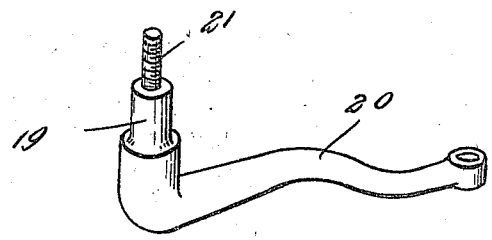
Figure 4 is a perspective of one of the elements, comprising my headlight construction.

Referring to the drawings in detail, 5 designates the usual chassis bars of a vehicle, 6 the radiator, 7 the front axle, 8 the guiding wheels, 9 the wheel fenders, and 10, the usual connecting rod or the vehicle steering mechanism. It is to be understood that these elements are not of the essence of my invention, they being found upon practically all types of motor vehicles, and are shown for more adequately disclosing the association of my headlight construction therewith.

My invention per se, embodies the attachment at the points 11 to the lower end of the radiator casing of a cross brace in the form of a flat-like rod 12. As clearly shown in Figure 1, the ends of this rod are inclined upwardly, and are secured as clearly shown in Figure 2, to the said fenders 9 for providing an effective brace for these fenders.

Adjacent each side of the radiator 6, the rod 12 is formed with vertical bearing sleeves 13. 14 indicates the vehicle headlights, 15 the headlight posts, these posts being formed with flanges 16 adjacent their ends for resting upon the upper ends of the said sleeves 13. Between the said flanges 16 and upper ends of the sleeves 13 are anti-friction bearings 17, and the lower ends of the posts are formed with screw threaded sockets 18.

Within the lower ends of the sleeves 13 are vertical posts 19 of rearwardly directed arms 20, the upper ends of these posts being reduced and screw threaded for screw threaded engagement within the said sockets 18 of the lamp posts 15. Between the said arm posts 19, and the lower ends of the sleeves 13 are other anti-friction bearings 22, and pivotally connected at the points 23 between the inner ends of said rearwardly directed arms 20 are the yoked ends 24 of a connecting rod 25. Pivotally connected at its opposite ends to the said connecting rod 25 and the above mentioned rod 10 of the vehicle steering mechanism is a rod 26, whereby when the steering mechanism connecting rod 10 is actuated, the connecting rod 25 of the headlight construction will move therewith for consequently controlling the movement of the headlights 14 within their supports in a direction similar to the direction of the vehicle guiding wheels 8.

In view of the above description it will at once be apparent that I have provided a highly improved form of dirigible headlight construction for motor vehicles, and wherein one of the component elements thereof will effect a substantial bracing means for the front vehicle fender construction.

Although I have herein shown and described the preferred embodiment of the present invention, it is nevertheless to be understood that minor changes may be made therein, without departing from the spirit and scope of the invention as claimed.

Having thus described my invention, what

I claim as new, and desire to secure by Letters Patent is:—

A dirigible headlight structure for motor vehicles comprising a bar secured at its intermediate portion to the underside of the radiator and having upwardly and outwardly inclined end portions disposed over the fender and secured thereto, bearing sleeves mounted upon the inclined portions of the bar and disposed in alinement with each other at the opposite sides of the inclined portion, the sleeves having parallel end bearing edges which are disposed horizontally, angular arms having diametrically reduced end portions provided with threaded extremities, the said reduced end portions and the threaded extremities passing through the bar and being disposed within the sleeves and spaced from the inner surfaces thereof, means operatively connecting the arms together, lamp posts having reduced lower end portions disposed in the upper sleeve and spaced from the walls thereof and engaging the threaded extremities of the arms, said posts being provided with flanges which extend over the upper edges of the upper sleeve and close the openings through the sleeves, lamps mounted upon the posts, bearing balls interposed between the inner surfaces of the upper sleeves and the reduced portions of the posts and lying under the flanges and bearing balls interposed between the lower portions of the reduced parts of the arms and the lower edges of the lower sleeve.

In testimony whereof I affix my signature.

ORA C. HUGHES.